W. BARRY & L. H. PRENTICE.
Hose Pipes and Nozzles.
No. 150,742. Patented May 12, 1874.
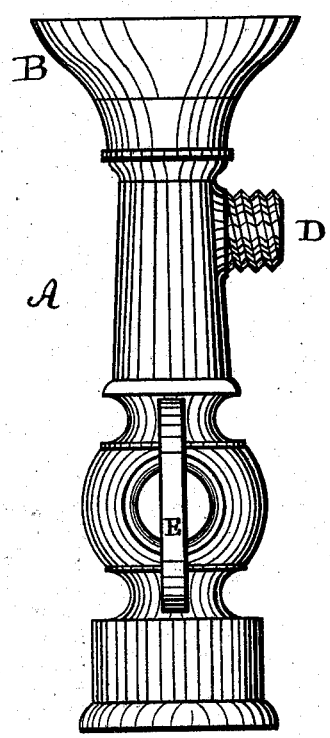
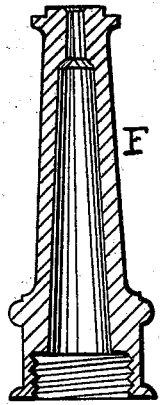
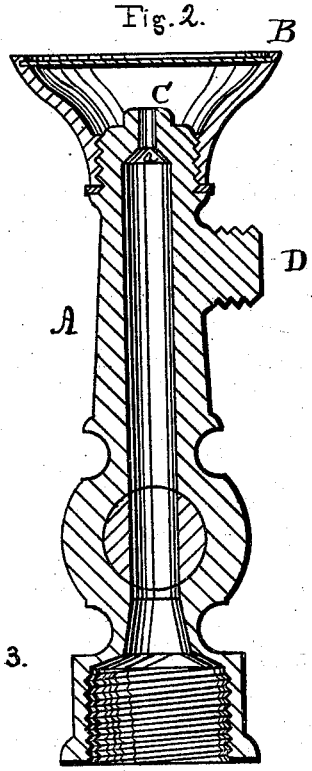
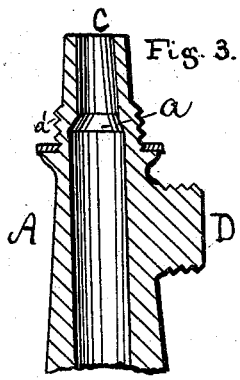
WITNESSES:
INVENTOR:

UNITED STATES PATENT OFFICE.

WILLIAM BARRY AND LEON H. PRENTICE, OF CHICAGO, ILLINOIS.

IMPROVEMENT IN HOSE-PIPES AND NOZZLES.

Specification forming part of Letters Patent No. 150,742, dated May 12, 1874; application filed September 22, 1873.

*To all whom it may concern:*

Be it known that we, WILLIAM BARRY and LEON H. PRENTICE, of the city of Chicago, in the county of Cook and State of Illinois, have invented new and useful Improvements in Pipes and Nozzles, of which the following is a full description, reference being had to the accompanying drawings, in which—

Figure 1 is an elevation, Fig. 2 a longitudinal section, Fig. 3 a section of a pipe provided with a larger nozzle, and Fig. 4 a section of a larger nozzle of smaller size to be used therewith.

In making hose-pipes and nozzles of large size, or for house and garden use, the pipe is made without a complete nozzle, and each pipe is furnished with a detachable complete nozzle, and if it is desired to use nozzles of two different sizes with the same pipe two separate detachable nozzles are always used. It is customary to contract the opening through the nozzle at the outer end thereof, as represented in the drawings, to increase the force of the discharge.

Our invention consists in so constructing the hose-pipe that in the end thereof there shall be a complete nozzle forming part of the pipe itself, and in providing the side of the pipe with a projection adapted to receive and hold a second nozzle or a rose when not in use.

In the drawings, A represents a hose-pipe, in the end of which is a complete nozzle, C, forming part of the pipe itself, the opening in the nozzle proper being suddenly contracted at the point $a$. The end of the pipe A is provided with a screw-thread, $a'$, to receive either a rose, B, or a second nozzle, F, which is provided with a coupling-screw. D is a projection on the side of the pipe A adapted to receive and hold the nozzle F or rose B when not in use.

It is frequently desirable to use nozzles of two sizes with the same pipe. As we construct the device one nozzle is placed in the end of the pipe itself as a part thereof, and a second nozzle, F, of smaller size, is provided detachable from the pipe.

In Fig. 2 is represented a pipe with a very small nozzle, adapted to be used for ordinary house purposes, or in connection with a detachable rose, B. When this rose is removed a perfect nozzle is left in the pipe itself, and it is not necessary to use a detachable nozzle.

This construction has the following advantages: The hose-pipe has in itself one complete nozzle, which is sufficient for ordinary use. If a second nozzle or a rose is to be used with the pipe, the same can, when not in use, be placed upon the projection D, where it will be always at hand, and not liable to be misplaced or lost.

What we claim as new is as follows:

The pipe A, forming a complete nozzle in itself, provided with the screw-thread $a'$ for the attachment of nozzle C of smaller size, or rose B and projection D furnishing a means of attachment for C or D, substantially as and for the purpose specified.

WILLIAM BARRY.
LEON H. PRENTICE.

Witnesses:
E. A. WEST,
O. W. BOND.